US011173618B2

(12) United States Patent
Koizumi

(10) Patent No.: US 11,173,618 B2
(45) Date of Patent: Nov. 16, 2021

(54) FASTNER

(71) Applicant: KOIZUMI FACTORY CORPORATION, Takaoka (JP)

(72) Inventor: Toshihiro Koizumi, Takaoka (JP)

(73) Assignee: KOIZUMI FACTORY CORPORATION, Toyama (JP)

( * ) Notice: Subject to any disclaimer, the term of this patent is extended or adjusted under 35 U.S.C. 154(b) by 0 days.

(21) Appl. No.: 16/770,472

(22) PCT Filed: Jan. 24, 2019

(86) PCT No.: PCT/JP2019/002308
§ 371 (c)(1),
(2) Date: Jun. 5, 2020

(87) PCT Pub. No.: WO2019/146709
PCT Pub. Date: Aug. 1, 2019

(65) Prior Publication Data
US 2021/0002022 A1 Jan. 7, 2021

(30) Foreign Application Priority Data
Jan. 29, 2018 (JP) .............................. JP2018-012522

(51) Int. Cl.
*B26B 3/08* (2006.01)
*B65D 5/64* (2006.01)
(Continued)

(52) U.S. Cl.
CPC ................ *B26B 3/08* (2013.01); *B65D 5/643* (2013.01); *B65D 5/6605* (2013.01);
(Continued)

(58) Field of Classification Search
CPC ........ B26B 3/08; B65D 5/643; B65D 5/6605; B65D 5/6611; B65D 5/6647; B65D 5/44; B65D 5/4283; B65D 5/2066; B65B 51/04
(Continued)

(56) References Cited

U.S. PATENT DOCUMENTS 5,887,782 A * 3/1999 Mueller ............... B65D 5/4608
229/183
6,230,965 B1 * 5/2001 Dismukes .............. B65D 5/643
229/125.39
(Continued)

FOREIGN PATENT DOCUMENTS

| JP | S51-010121 U | 1/1976 |
|----|--------------|--------|
| JP | S51-157421 U | 12/1976 |

(Continued)

OTHER PUBLICATIONS

An Office Action in the corresponding Japanese Patent Application No. 2018-012522 dated Apr. 10, 2018.
(Continued)

*Primary Examiner* — Christopher R Demeree
(74) *Attorney, Agent, or Firm* — Global IP Counselors, LLP

(57) ABSTRACT

A fastener for fixing a pair of opposing flaps of a box in a closed state includes a receiving part extending along a first direction, with a flap abutting part configured to abut surfaces of the flaps being arranged on at least one side of the receiving part, the flap abutting part constituting a tab part for which at least a portion is curvable or bendable upward, a linking part having a rod shape and extending from a center portion of the receiving part, and a pressing part having a rod shaped that extends outwardly from an end of the linking part along the first direction, the pressing part being configured to be inserted into a gap at a juncture of the flaps so that spaces on both sides of the linking part between
(Continued)

the receiving part and the pressing part constitute insertion areas into which the flaps are inserted.

10 Claims, 10 Drawing Sheets

(51) Int. Cl.
*B65D 5/66* (2006.01)
*B65D 5/44* (2006.01)
(52) U.S. Cl.
CPC .......... *B65D 5/6611* (2013.01); *B65D 5/6647* (2013.01); *B65D 5/44* (2013.01)
(58) Field of Classification Search
USPC ............ 229/125.39, 125.37, 125.21, 125.01, 229/125.23, 125.41, 198.3, 199; 24/545, 24/563, 306, 580.1; 292/288; 220/324
See application file for complete search history.

(56) References Cited

U.S. PATENT DOCUMENTS

| | | | | |
|---|---|---|---|---|
| 7,284,688 B1* | 10/2007 | Barsness | ................ | B65D 5/643 229/125.39 |
| 7,854,372 B1* | 12/2010 | Bartone, Sr. | ......... | B65D 5/4283 229/125.39 |
| 8,998,071 B2* | 4/2015 | Sublett | ................. | B65D 5/6611 229/125.39 |
| 9,321,566 B2* | 4/2016 | Weber | .................. | B65D 5/2066 |
| 10,407,206 B2* | 9/2019 | Etem | ...................... | B65D 5/425 |
| 10,633,140 B1* | 4/2020 | Vergara | ................ | B65D 5/4266 |

FOREIGN PATENT DOCUMENTS

| | | |
|---|---|---|
| JP | S56-038023 U | 4/1981 |
| JP | S58-067726 U | 5/1983 |
| JP | 2001301753 A | 10/2001 |
| JP | 2010006408 A | 1/2010 |
| JP | 2014151952 A | 8/2014 |
| JP | 2016043968 A | 4/2016 |
| WO | 2008076866 A1 | 6/2008 |

OTHER PUBLICATIONS

Translation of the Search Report of the International Searching Authority, dated Mar. 12, 2019.

* cited by examiner

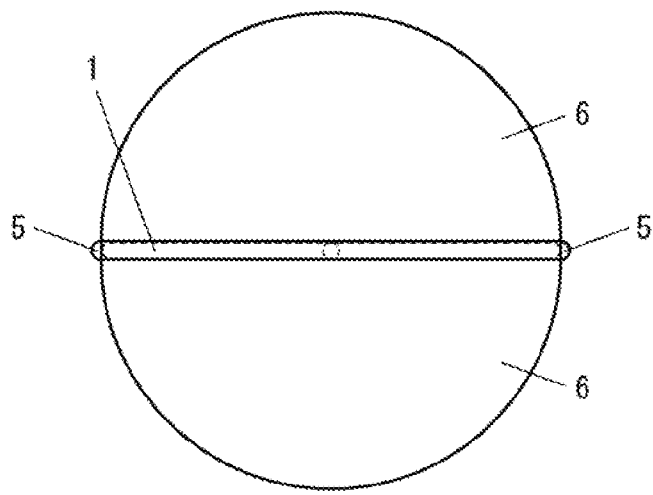
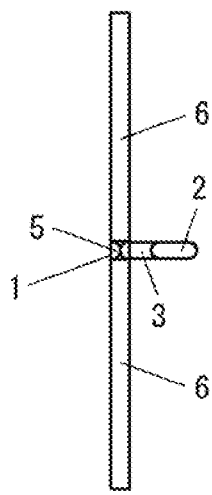
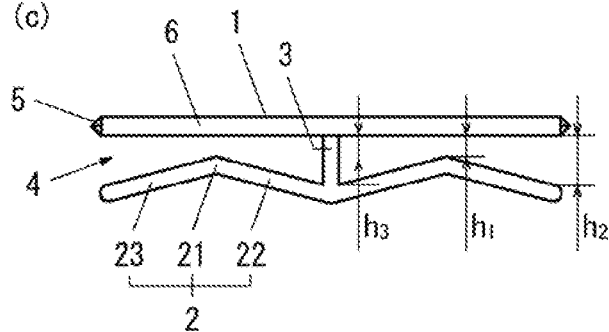
FIG. 1
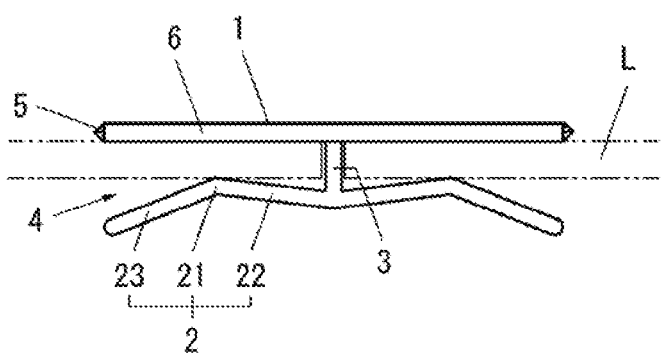
FIG. 2

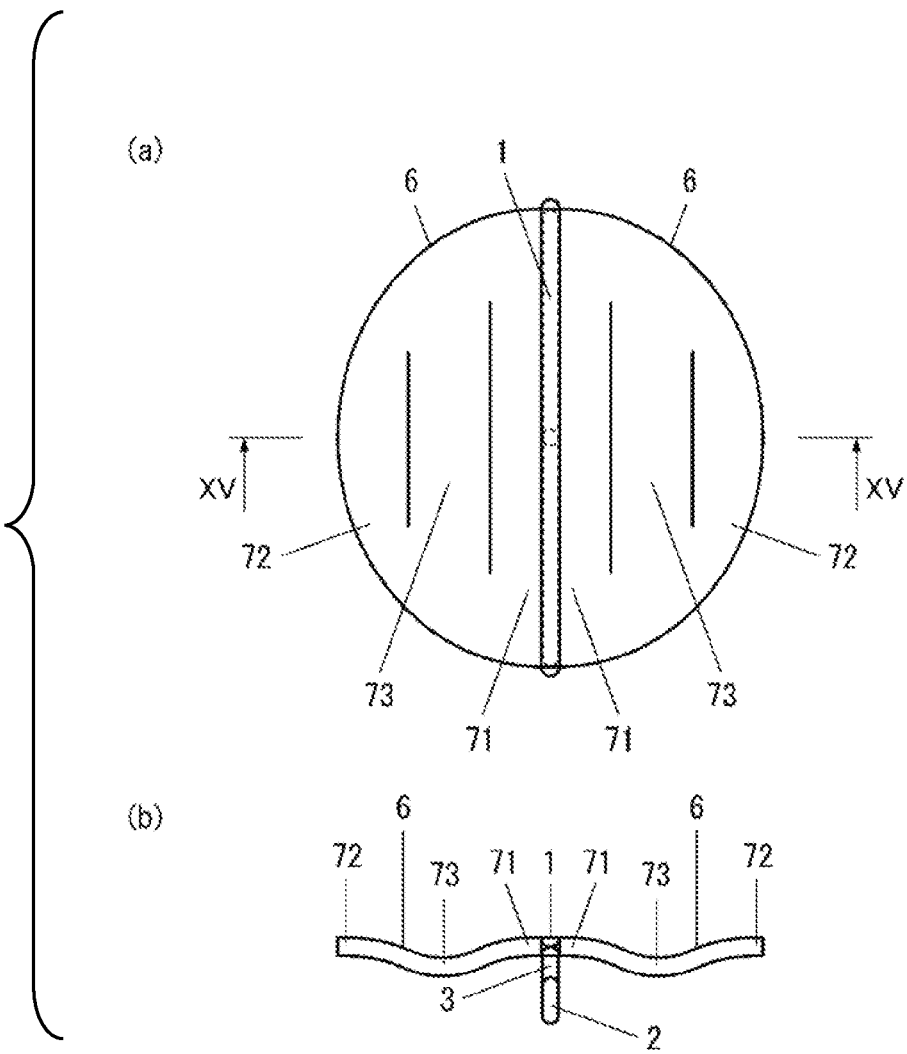
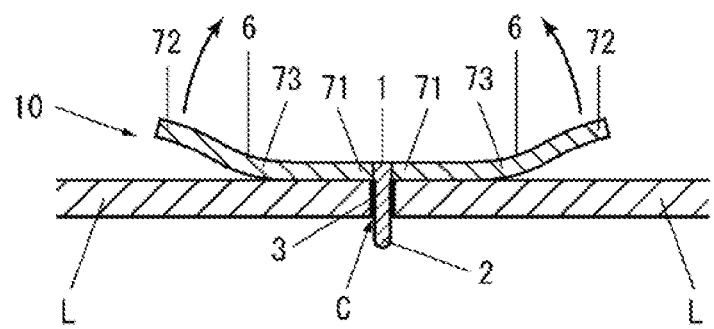

FASTNER

CROSS-REFERENCE TO RELATED APPLICATIONS

This application is a U.S. national phase application of PCT/JP2019/002308, filed on Jan. 24, 2019, which claims priority to Japanese Patent Application No. 2018-012522 filed on Jan. 29, 2018.

TECHNICAL FIELD

The present invention relates to a fastener for fixing double-door type flaps of a box in a closed state.

BACKGROUND ART

In recent years, as internee shopping is used often, many cardboard boxes used for delivering merchandise accumulate in homes, offices, etc., and there is a desire to reuse these for storage, etc. Typically, cardboard boxes such as RSC style boxes have double-door type flaps on the top surface, and tape is applied to fix this with the flap in the closed state. Thus, when this kind of cardboard box was used for storage, etc., the tape had to be reapplied each time the flap was opened and closed, which was inconvenient.

In light of this, fasteners of a box flap such as those shown in Japanese Laid Open Patent Publication No. 2001-301753 and Japanese Laid Open Patent Publication No. 2016-43968 have been proposed. The fastener of Japanese Laid Open Patent Publication No. 2001-301753 has insertion areas provided back to back, with one of the double-door type flaps of the box inserted in one insertion area in advance to attach the fastener, and while closing both flaps, the other flap is inserted in the other insertion area to fix the flap. Also, the fastener of Japanese Laid Open Patent Publication No. 2016-43968 comprises a lower presser and an upper presser, and in a state with the double-door type flaps of the box half closed, the lower presser is inserted in the juncture of the flaps, and after the flaps are closed, by holding the upper presser and rotating, the fastener is locked in the flaps to fix the flaps.

SUMMARY

However, in the fastener of Japanese Laid Open Patent Publication No. 2001-301753, there were cases when the step of inserting the other flap while closing both flaps in the insertion areas of the fastener attached to one flap in advance was difficult. Also, in the fastener of Japanese Laid Open Patent Publication No. 2016-43968, the upper presser has a flat plate shape, so there were cases when the step of rotating while holding this was difficult.

The present invention was created considering such circumstances, and its purpose is to provide a fastener for which it is possible to more easily fix the double-door type flaps of a box in a closed state.

One aspect of the present disclosure relates to a fastener for fixing double-door type flaps of a box in a closed state, comprises a receiving part, a pressing part, and a linking part, wherein the receiving part and the pressing part oppose each other with the linking part interposed, spaces of both sides sandwiching the linking part between the receiving part and the pressing part are insertion areas in which to insert the flaps of the box, the receiving part extends to left and right, flap abutting parts that abut the surface of the flaps are provided on at least one side of the front and rear thereof, the flap abutting parts are tab parts for which at least a portion is curvable or bendable upward, the linking part is rod shaped, and extends downward from the left-right center of the receiving part, and the pressing part is rod shaped in the top view and can be inserted from a gap in the juncture of both flaps in the closed state, and extends to both left and right sides from the bottom edge of the linking part. The tab parts being curvable or bendable upward includes various structures by which it is possible to turn up the tab parts, such as an item for which the tab part itself is made from a soft material and is curvable, the junction part of the tab part and another part is a fold or a hinge, and that part is bendable, etc. Also, in the description above, the front-rear, left-right, and up-down directions are shown, but these are defined for convenience to show the relationship of the members with each other, and does not limit the direction of the usage state.

Also, with the present disclosure, tip parts of the tab parts may constitute finger hooking parts that are always separated from the flaps in a state with the bottom surface of root parts abutted on the flaps. The root parts of the tab parts are the parts that join with the other part, and the tip parts of the tab parts are the parts on the side opposite to the root parts, and are parts that move by curving or bending.

Furthermore, with the present disclosure, a cutter part may be provided on the receiving part, the pressing part, or the linking part. The cutter part is sufficient provided it is sharp enough to cut the tape by which the flaps of the box are closed.

According to the present disclosure, by inserting the double-door type flaps of the box in the insertion areas at both sides of the linking part, it is possible to fix the flaps in a closed state. Also, since the linking part is rod shaped, by rotating after inserting the pressing part in the gap of the double-door type flaps of the box, the flaps are inserted in the insertion areas between the receiving part and the pressing part, and it is possible to fix the flaps in a closed state, but at this time, since the tab parts of the flap abutting parts provided on the receiving part are curvable or bendable upward, by turning up the tab parts, it is easier to grip with the fingers, and the fastener can be rotated easily.

Also, provided there are finger hooking parts, in a state with the bottom surface of the root parts of the tab parts abutting the flaps, specifically, a state with the pressing part inserted in the gap of the double-door type flaps of the box, the finger hooking parts have the tip parts separated from the flap, so it is possible to easily turn up the tab parts.

Furthermore, provided there is a cutter part, it is possible to cut the tape and unpack the box, which is highly convenient because other tools are not necessary from the unpacking operation to the repacking operation.

BRIEF DESCRIPTION OF THE DRAWINGS

FIG. 1 shows three views of a first embodiment of a fastener, with (a) being a plan view, (b) being a side view, and (c) being a front view.

FIG. 2 is a front view showing a state of the first embodiment with flaps inserted in insertion areas.

FIG. 14 shows a fifth embodiment of the fastener, with (a) being a plan view and (b) being a side view.

FIG. 15 is a cross section view of line XV-XV of FIG. 14.

DETAILED DESCRIPTION OF EMBODIMENTS

Figure 3:
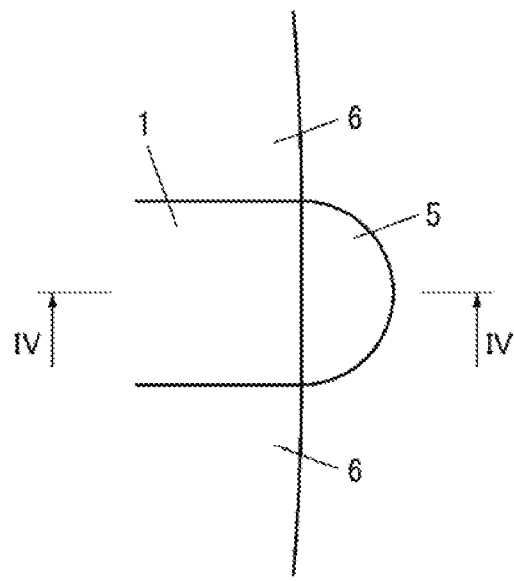
FIG. 3 is an enlarged plan view of a cutter part of the first embodiment.

Following, the specific contents of the fastener of the present invention are explained. The subject of this fastener is various types of boxes comprising double-door type flaps, fixing the flaps in a closed state, but the subject of this example is a cardboard box. Hereafter, the left-right direction (or the first direction) is the direction in which a receiving part 1 noted later extends, and the front-rear direction (or the second direction) is the direction orthogonal to the left-right direction. As shown in FIG. 1, a first embodiment of this fastener comprises a receiving part 1, a pressing part 2, a linking part 3, insertion areas 4, a cutter part 5, and flap abutting parts (tab parts) 6.

The receiving part 1 is rod shaped with a square cross section and a length of approximately 5 cm, and extends horizontally in the left-right direction. Also, on the bottom surface of the left-right center of the receiving part 1 is formed the linking part 3 that is rod shaped with a circular cross section and extends downward. Furthermore, at the bottom end of the linking part 3 is formed the pressing part 2 that is rod shaped with a circular cross section and extends to both left and right sides, specifically, the receiving part 1 and the pressing part 2 oppose each other with the linking part 3 interposed. The pressing part 2 has a left-right symmetrical shape with the linking part 3 as the center axis, extends diagonally upward from the bottom end of the linking part 3, and has a V shape that is bent midway and extends diagonally downward. Here, the bent part is a bending point 21, the part extending diagonally upward facing the outer peripheral side further to the inside than the bending point 21 is an inside part 22, and the part extending diagonally downward facing the outer peripheral side further to the outside than the bending point 21 is an outside part 23. The left-right length of the inside part 22 and the outside part 23 is approximately the same, and the left-right position of the tip of the outside part 23 is roughly the same as the left-right position of the tip of the receiving part 1.

Also, the spaces at both the left and right sides sandwiching the linking part 3 between the receiving part 1 and the pressing part 2 are the insertion areas 4 in which the flaps of the box are inserted. The insertion areas 4 have a shape for which the vertical width is narrowest in the position of the bending point 21 of the pressing part 2, and broaden in width facing from the position of the bending point 21 toward the opening side and the depth side, a vertical width h1 at the position of the bending point 21 is narrower than the thickness of that flap of the box that is the target, and a vertical width h2 at the opening end part and a vertical width h3 in the deepest part are broader than the thickness of the flap of the box that is the target. The receiving part 1, the linking part 3, and the pressing part 2 are made from hard resin, and are integrally molded. Also, as shown in FIG. 2, when flaps L of the box are inserted in the insertion areas 4, the vertical width h1 at the position of the bending point 21 is narrower than the thickness of the flaps L, so the flaps L have the inside part 22 elastically deformed to expand the insertion areas 4. Thus, by the elasticity of the inside part 22, the pressing part 2 presses the flaps L that are inserted in the insertion areas 4 into the receiving part 1. Working in this way, by inserting the double-door type flaps L of the box in a closed state in both left and right side insertion areas 4, the flaps L are fixed in that state.

Figure 4:
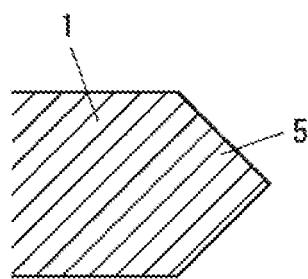
FIG. 4 is a cross section view of line IV-IV of FIG. 3.

Also, as shown in FIG. 1, the cutter part 5 is provided at both left and right end parts (distal ends) of the receiving part 1. As shown in FIG. 3 and FIG. 4, the cutter part 5 has a semicircular shape in the plan view, has a triangular shape or an angular corner in the front view, and has a sharp shape facing the outer peripheral side. This cutter part 5 is made from a hard resin, and is integrally molded with the receiving part 1. Having a sharp shape from the front view, it is sharp enough to cut the tape for which the flap of the box is closed, but is made of resin and has a semicircular shape in the plan view, so is safe because injury will not occur even if touched by a finger.

Furthermore, the receiving part 1 has flap abutting parts 6 provided on the front side surface and the rear side surface. The flap abutting parts 6 have flat plate shapes, and extend in the horizontal direction at both front and rear sides with the receiving part 1 as the center. One flap abutting part 6 has a semicircular shape in the plan view, its diameter is along the receiving part 1, and with the receiving part 1 and the flap abutting parts 6 at both the front and rear sides, an approximate circle is formed in the plan view. Also, the flap abutting parts 6 are made from a soft resin that can be curved vertically by human force, and are integrally molded with the receiving part 1 using two color molding. Thus, with the first embodiment, the flap abutting parts 6 overall correlate to the tab parts, and the flap abutting parts 6 are the tab parts 6.

Figure 5:
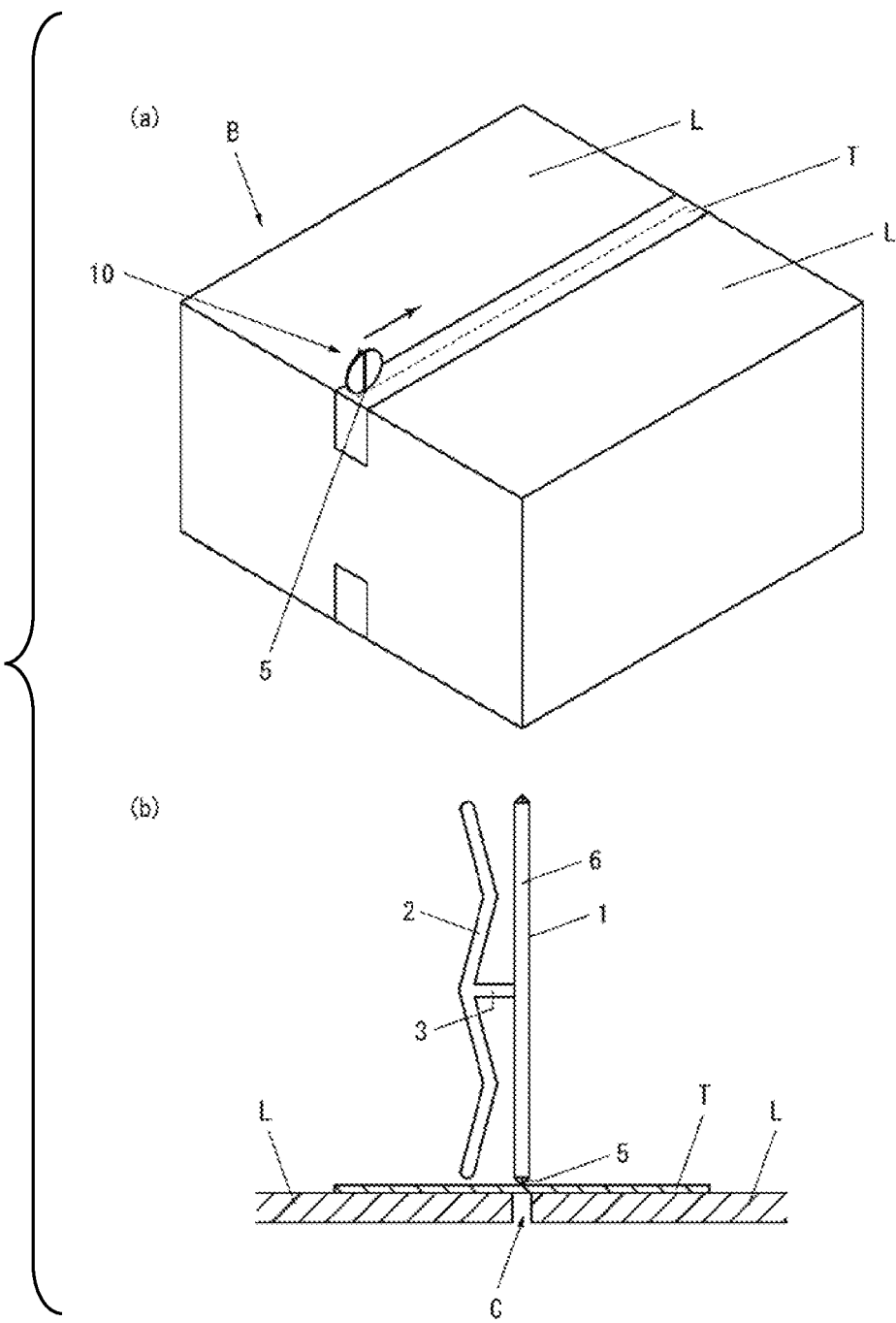
FIG. 5 shows a case of using the cutter part of the first embodiment, with (a) being an overall view, and (b) being an enlarged view.

Next, the method for using the fastener is explained. This fastener 10 can be used from the unpacking operation to the repacking operation of a box B, and first, the unpacking operation is shown. As shown in FIG. 5 (a), the unpacking operation is for the box B which has the double-door type flaps L on the top surface, with the flaps L being closed using tape T. For this box B, the tape T is cut using the cutter part 5 of the fastener 10, but as shown in FIG. 5 (b), at that time, the tip of the cutter part 5 is pressed at the part of the tape T on a gap C of the juncture of the flaps L, and the tape T is cut by moving along the juncture, so the flaps L can be opened. At this time, the cutter part 5 is provided on the end part of the rod shaped receiving part 1, so by holding the receiving part 1, it is possible to use this in the same sense as a typically shaped cutter.

Figure 6:
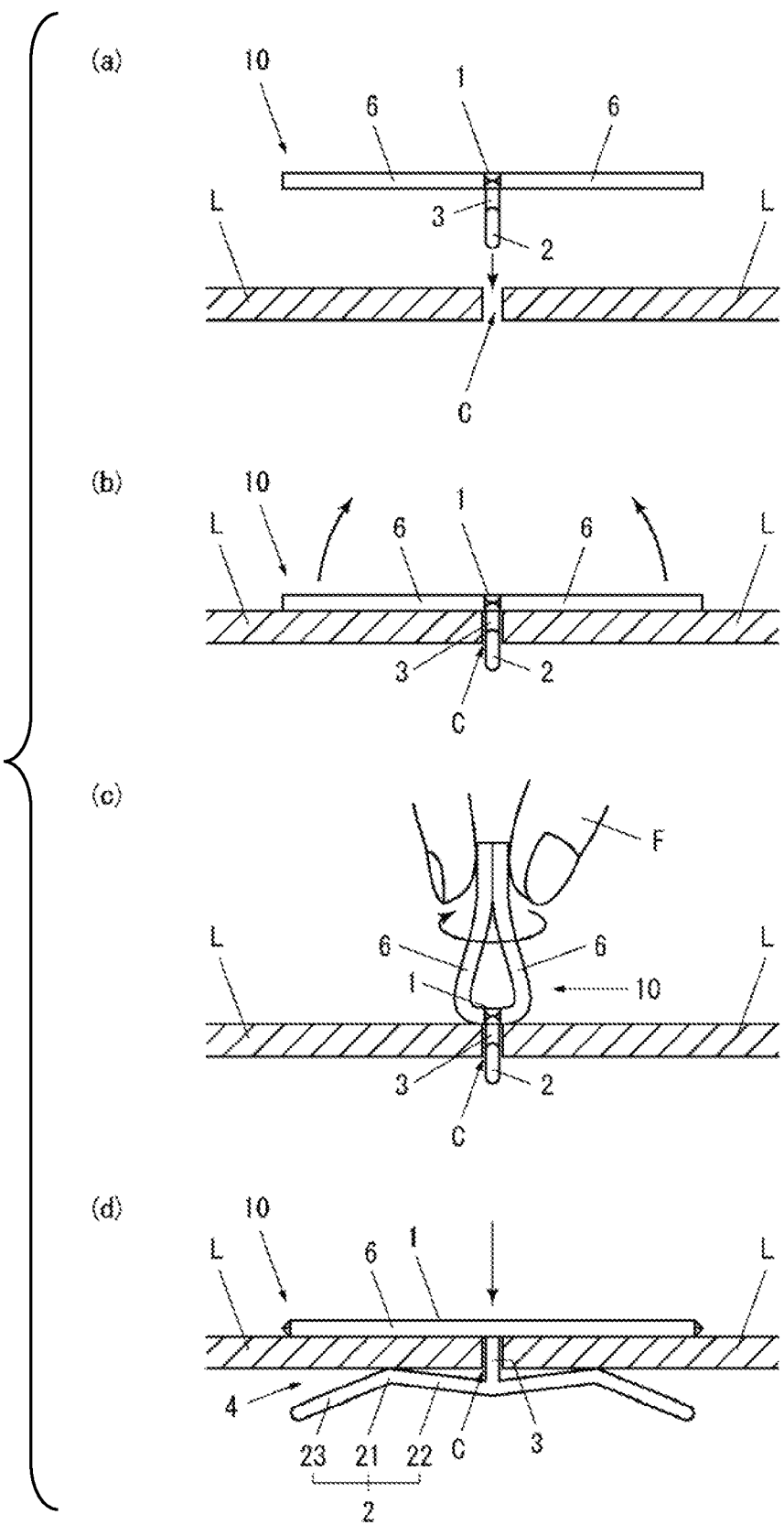
FIG. 6 (*a*) to (*d*) show the procedure for fixing the flaps using the first embodiment.
Figure 7:
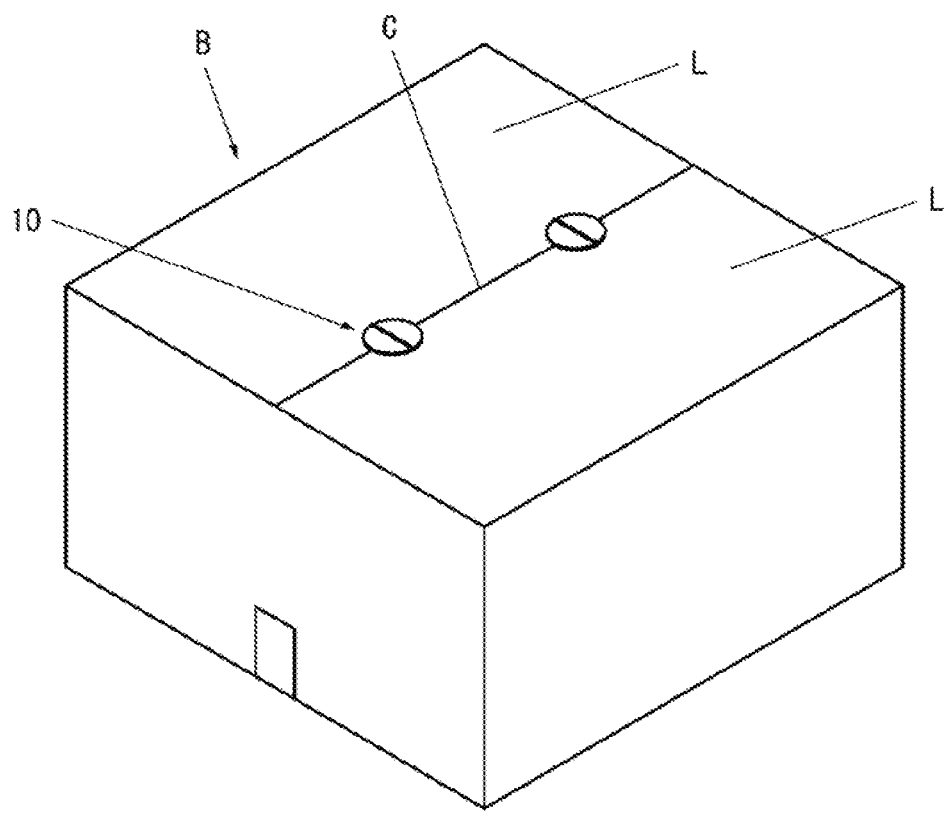
FIG. 7 is a perspective view of the box with the flaps fixed in a closed state using the first embodiment.

Next, the repacking operation is shown. With the repacking operation, the object is to store separate articles in the unpacked box B. With the example shown in FIG. 6, the tape cut during the unpacking operation is taken off, but the tape may also be left on. First, after storing the articles and closing the double-door type flaps L, as shown in FIG. 6 (a), (b), the pressing part 2 of the fastener 10 is inserted from the top side into the gap C of the juncture of both flaps L, and the bottom surface of the tab parts 6 (flap abutting parts 6) is abutted on the top surface of the flaps L. At this time, by the receiving part 1 being oriented parallel to the juncture, the pressing part 2 is also aligned oriented to the juncture, and it is possible to insert the rod shaped pressing part 2 into the narrow gap C of the juncture. Next, as shown in FIG. 6 (*b*), (*c*), the tab parts 6 of both sides are turned up, the tips of both tab parts 6 are overlapped and pinched using fingers F. Also, from this state, the tab parks 6 are twisted, and the fastener 10 is rotated by 90 degrees around the vertical axis. Having done that, as shown in FIG. 6 (*d*), with rotation of the receiving part 1 and the pressing part 2, the flaps L are inserted in the insertion areas 4 at both sides. At this time, in a shape with the insertion areas 4 broadened facing the opening side, the vertical width of the opening end parts is broader than the thickness of the flaps L, so the flaps L are inserted smoothly in the insertion areas 4 without the end parts of the flaps L being caught on the pressing part 2. Also, in the bending point 21 of the pressing part 2, the flap L expands the insertion area 4 by elastically deforming the inside part 22, and by the elasticity of the inside part 22, the pressing part 2 presses the flap L inserted in the insertion area 4 on the receiving part 1. The turned up tab part 6 returns to the original flat plate shape when the finger is removed, and abuts the top surface of the flap L. Working in this way, one or a plurality of the fasteners 10 are attached depending on the size of the box B, and the repacking operation is completed. Shown in FIG. 7 is a case with the box B in a state with the repacking operation completed, with two fasteners 10 attached.

With the first embodiment of the fastener of the present invention configured in this way, by inserting the double-door type flaps L of the box B in the insertion areas 4 of both sides of the linking part 3, it is possible to fix the flaps L in a closed state. Then, using the cutter part 5 provided on the receiving part 1, it is possible to cut the tape T and unpack the box B, and since other tools are not required from the unpacking operation to the repacking operation, this is very convenient. Also, the cutter part 5 is provided on the end part of the rod shaped receiving part 1, and it is possible to use this in the same sense as a typically shaped cutter, so the unpacking operation can be performed more easily.

In the fastener of Japanese Laid Open Patent Publication No. 2001-301753, there were cases when the step of inserting the other flap while closing both flaps in the insertion areas of the fastener attached to one flap in advance was difficult. Also, in the fastener of Japanese Laid Open Patent Publication No. 2016-43968, the upper presser has a flat plate shape, so there were cases when the step of rotating while holding this was difficult. In contrast to this, the fastener of the present invention is more easily able to do fixing in a state with the double-door type flaps of the box closed. Specifically, since the linking part 3 is rod shaped with a circular cross section, by rotating after inserting the pressing part 2 in the gap C of the double-door type flaps L of the box B, the flaps L are inserted in the insertion areas 4 between the receiving part 1 and the pressing part 2, and it is possible to fix the flaps L in the closed state, but at this time, the tab parts 6 provided on the receiving part 1 are curvable, so by turning up the tab parts 6 at both sides and overlapping the tips of both tab parts 6 with each other, it is easier to grip with the fingers, and to easily rotate the fastener.

Also, the pressing part 2 is rod shaped, so in a state with the double-door type flaps L of the box B closed, it is possible to insert as long as there is at least a small gap C between both flaps L. Thus, it is possible to attach the fastener after closing the flaps L, so the operation is easy. In a state with the double-door type flaps L of the box B closed, when the tips of both flaps L are in close contact and there is no gap, it is also possible to completely close the flaps L after inserting the pressing part 2 in the gap between both flaps L in a state with the flaps L half closed. Furthermore, in a state with the fastener attached to the box B, the tab parts 6 (flap abutting parts 6) have a flat plate shape, and are thin, so there is no obstruction to stacking the boxes B.

Figure 8:
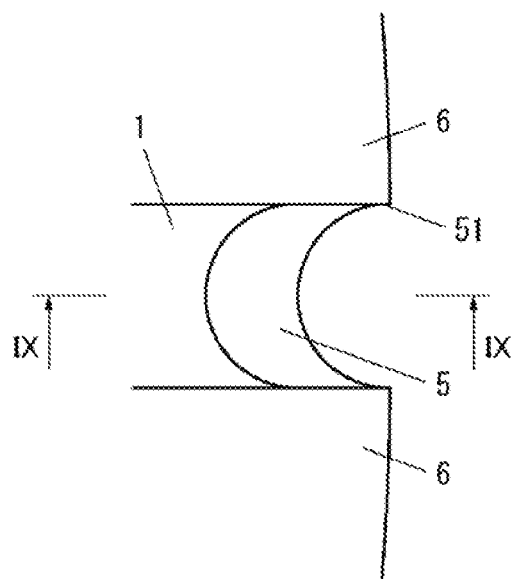
FIG. 8 is an enlarged plan view of the cutter part of a second embodiment of the fastener.
Figure 9:
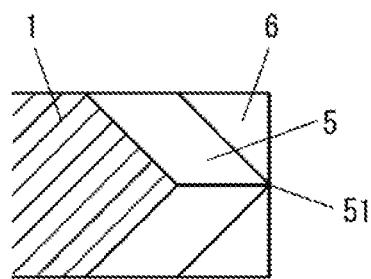
FIG. 9 is a cross section view of line IX-IX of FIG. 8.

Next, the second embodiment of the fastener of the present invention will be explained with a focus on the differences from the first embodiment. Compared with the first embodiment, the second embodiment has a different shape for the cutter part 5. The cutter part 5 of the second embodiment is provided at both left and right end parts (distal ends) of the receiving part 1, and as shown in FIG. 8 and FIG. 9, has a semicircular shape recessed facing the left-right center of the receiving part 1 in the plan view, and the vertical cross section in the front view has a triangular shape or an angular corner and a sharp shape facing the outer peripheral side. This cutter part 5 is made from a hard resin, and is integrally molded with the receiving part 1.

With the cutter part 5 of the second embodiment formed in this way, the front-rear tip is a sharp cutting edge part 51, so it is possible to cut by pressing this cutting edge part 51 on the tape, but since it does not protrude to the outer peripheral side more than the front-rear tab parts 6 (flap abutting parts 6), there is no direct touching by fingers, etc., so it is safe. The second embodiment of the fastener otherwise exhibits the same operational effects as the first embodiment.

Figure 10:
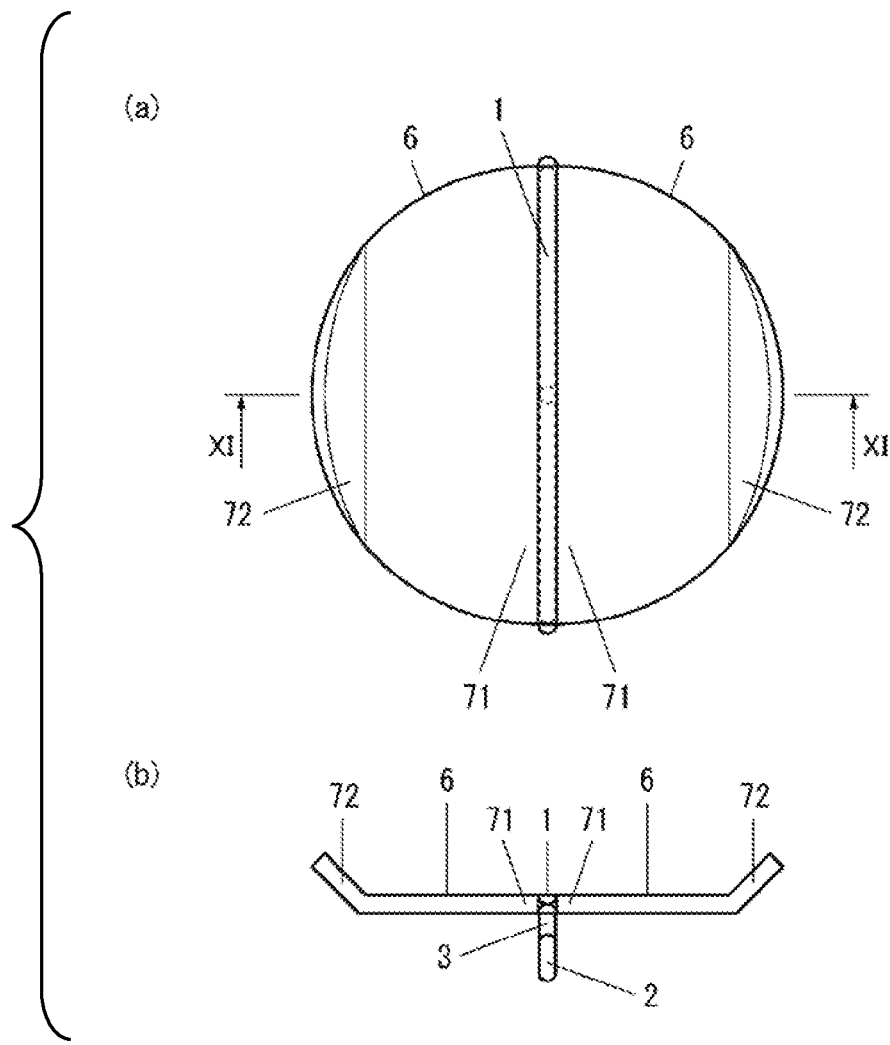
FIG. 10 shows a third embodiment of the fastener, with (a) being a plan view and (b) being a side view.
Figure 11:
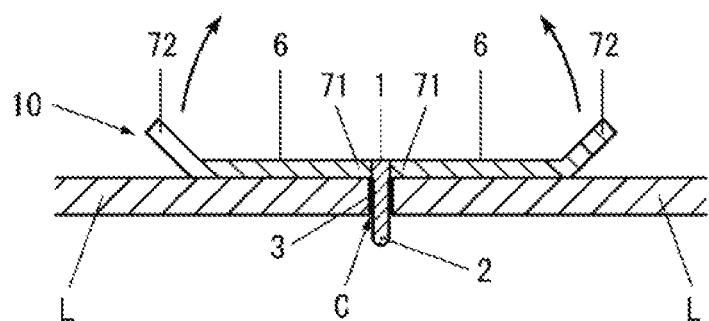
FIG. 11 is a cross section view of line of FIG. 10.

Next, a third embodiment of the fastener of the present invention is explained focusing on the difference points from the first embodiment. Compared to the first embodiment, the third embodiment has a different shape for the flap abutting parts 6 (tab parts 6). As shown in FIG. 10 and FIG. 11, the flap abutting parts 6 of the third embodiment are flat plates, and extend in the horizontal direction at both front and rear sides with the receiving part 1 as the center. One flap abutting part 6 is approximately semicircular in shape in the plan view, its diameter is along the receiving part 1, and with the receiving part 1 and the flap abutting parts 6 at both the front and rear sides, an approximate circle is formed in the plan view. Also, the flap abutting parts 6 are made from a soft resin that can be curved vertically by human force, and are integrally molded with the receiving part 1 using two color molding. Thus, in the third embodiment, the flap abutting parts 6 overall correlate to the tab parts, and the flap abutting parts 6 are the tab parts 6. Then, both end parts at front and rear of the tab parts 6, specifically, tip parts 72 of the sides opposite to root parts 71 (base parts) that join with the receiving part 1 are bent diagonally upward. The range of the bent parts is approximately ¼ the front-rear width of the tab parts 6, and the orientation is at approximately a 45 degree incline with respect to the horizontal direction. Thus, as shown in FIG. 11, when the pressing part 2 of the fastener 10 is inserted from above in the gap C of the juncture of both flaps L, in a state with the bottom surface of the root parts 71 of the tab parts 6 abutting the top surface of the flaps L, the tip parts 72 separate from the top surface of the flaps L, and the tip parts 72 are finger hooking parts 72.

According to this third embodiment, after inserting the pressing part 2 in the gap C of the juncture of both flaps L, by hooking the fingers in the finger hooking parts 72, it is possible to easily turn up the tab parts 6, and the operation of gripping the tab parts 6 and rotating the fastener 10 is easy. The third embodiment of the fastener otherwise exhibits the same operational effects as the first embodiment. The tab parts 6 are made from a soft resin, so when another box is stacked on a box with this fastener 10 attached, the tip parts 72 (finger hooking parts 72) bent diagonally upward are crushed by the upper box, and the tab parts 6 overall have a flat plate shape. Thus, there is no obstruction when stacking boxes.

Figure 12:
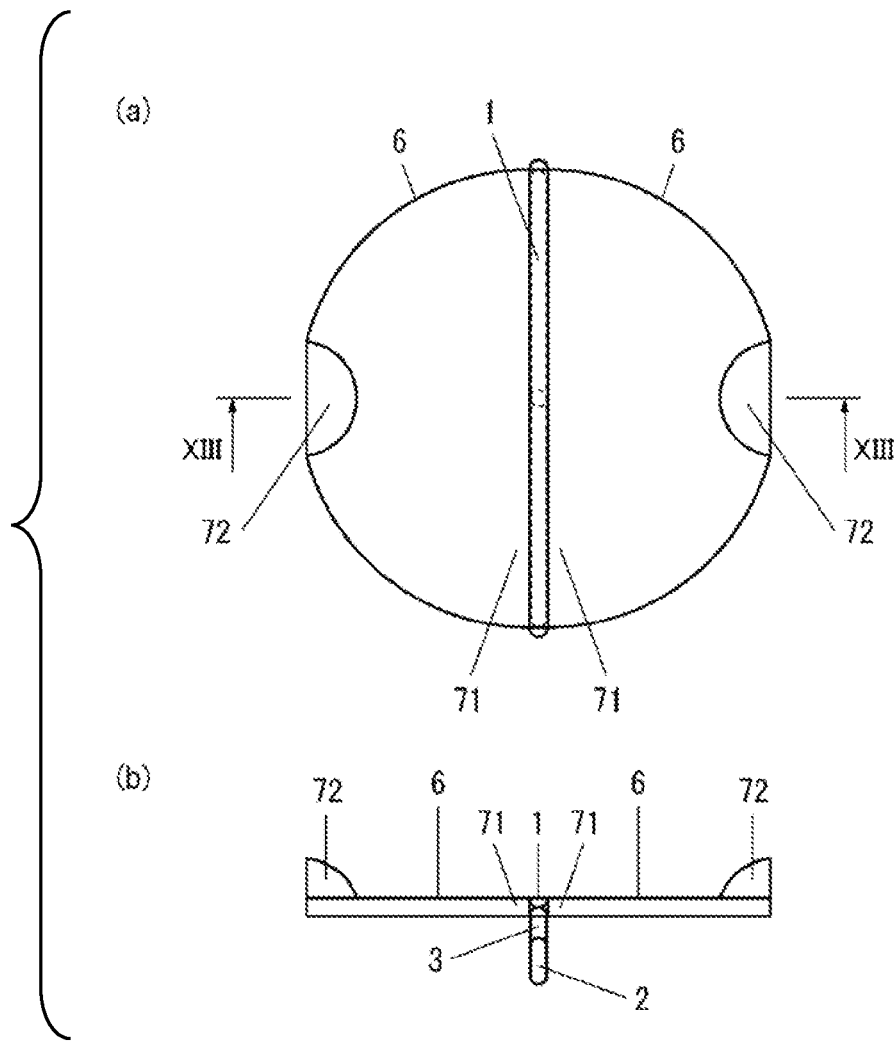
FIG. 12 shows a fourth embodiment of the fastener, with (a) being a plan view and (b) being a side view.
Figure 13:
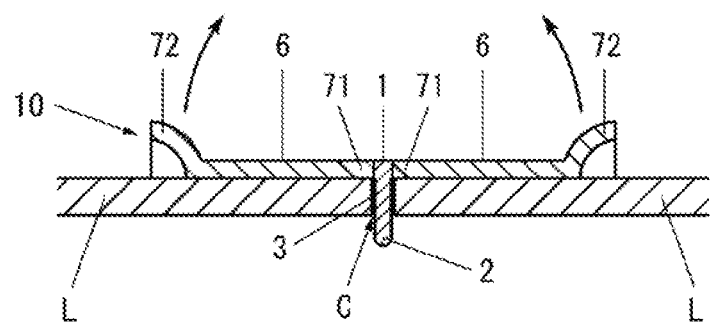
FIG. 13 is a cross section view of line of FIG. 12.

Next, a fourth embodiment of the fastener of the present embodiment is explained with a focus on the difference points from the first embodiment. Compared to the first embodiment, the fourth embodiment differs in the shape of the flap abutting parts 6 (tab parts 6). As shown in FIG. 12 and FIG. 13, the flap abutting parts 6 of the fourth embodiment have a flat plate shape, and extend in the horizontal direction at both front and rear sides with the receiving part 1 as the center. One flap abutting part 6 is approximately semicircular in the plan view, the diameter is along the receiving part 1, and with the receiving part 1 and the flap abutting parts 6 of both the front and rear sides, this is approximately circular in the plan view. Also, the flap abutting parts 6 are made from a soft resin that can be curved vertically by human force, and are integrally molded with the receiving part 1 using two color molding. Thus, in the fourth embodiment, the flap abutting parts 6 overall correlate to the tab parts, and the flap abutting parts 6 are the tab parts 6. Also, both end parts at front and rear of the tab parts 6, specifically, the tip parts 72 of the sides opposite to the root parts 71 that join with the receiving part 1 are raised in a dome shape. More specifically, the approximately semicircular region that has the farthest tip points of the tab parts 6 (both front and rear end points) rises upward in a spherical shell shape with the farthest tip point as the center, and the front-rear width of this dome shaped part is approximately ¼ the front-rear width of the tab part 6. Thus, as shown in FIG. 13, when the pressing part 2 of the fastener 10 is inserted from above in the gap C of the juncture of both flaps L, the tip parts 72 are separated from the top surface of the flaps L, and the tip parts 72 are the finger hooking parts 72.

According to this fourth embodiment, after inserting the pressing part 2 in the gap C of the juncture of both flaps L, by hooking fingers in the finger hooking parts 72, it is possible to easily turn up the tab parts 6, and the operation of gripping the tab parts 6 and rotating the fastener 10 is easy. The fourth embodiment otherwise exhibits the same operational effects as the first embodiment. The tab parts 6 are made from soft resin, so when another box is stacked on the box with this fastener 10 attached, the tip parts 72 (finger hooking parts 72) that have risen in a dome shape are crushed by the top box, and the tab parts 6 overall have a flat plate shape. Thus, there is no obstruction when stacking boxes.

Next, a fifth embodiment of the fastener of the present invention is explained with a focus on the difference points from the first embodiment. Compared to the first embodiment, the fifth embodiment differs in the shape of the flap abutting parts 6 (tab parts 6). As shown in FIG. 14 and FIG. 15, the flap abutting parts 6 of the fifth embodiment have flat plate shapes, and extend while curving to both front and rear sides with the receiving part 1 as the center so that the flap abutting parts 6 have wavy cross-sectional shapes (see, (b) in FIG. 14). One flap abutting part 6 is approximately semicircular in shape in the plan view, its diameter is along the receiving part 1, and with the receiving part 1 and the flap abutting parts 6 at both the front and rear sides, an approximate circle is formed in the plan view. Also, the flap abutting parts 6 are made from a soft resin that can be curved vertically by human force, and are integrally molded with the receiving part 1 using two color molding. Thus, in the fifth embodiment, the flap abutting parts 6 overall correlate to the tab parts, and the flap abutting parts 6 are the tab parts 6. Also, to give a more detailed description of the curved shape of the tab parts 6, the root parts 71 joining the receiving part 1 extend horizontally, and subsequently, intermediate parts 73 curve in an arc shape to be convex downward, and even more subsequently, the tip parts 72 extend horizontally at approximately the same height as the root parts 71. The front-rear width of the curved intermediate parts 73 is approximately ½ of the front-rear width of the tab parts 6. For the fastener 10 of the fifth embodiment formed in this way, when the pressing part 2 is inserted from above in the gap C of the juncture of both flaps L, first, the bottom surface of the intermediate parts 73 curved downward abuts the top surface of the flaps L, and furthermore, when the bottom surface of the root parts 71 is inserted far enough to abut the top surface of the flaps L, the tab parts 6 are deformed so that the tip parts 72 rise as the root parts 71 drop with the intermediate parts 73 as a fulcrum. Thus, as shown in FIG. 15, in a state with the bottom surface of the root parts 71 of the tab parts 6 abutting the top surface of the flaps L, the tip parts 72 separate from the top surface of the flaps L, and the tip parts 72 are the finger hooking parts 72.

With this fifth embodiment, after inserting the pressing part 2 in the gap C of the juncture of both flaps L, by hooking fingers in the finger hooking parts 72, it is possible to easily turn up the tab parts 6, and the operation of gripping the tab parts 6 and rotating the fastener 10 is easy. The fifth embodiment of the fastener otherwise exhibits the same operational effects as the first embodiment. The tab parts 6 are made from a soft resin, so when another box is stacked on a box with this fastener 10 attached, the tip parts 72 (finger hooking parts 72) separated from the top surface of the flap L are crushed by the upper box, and the tab parts 6 overall have a flat plate shape. Thus, there is no obstruction when stacking boxes.

Figure 16:
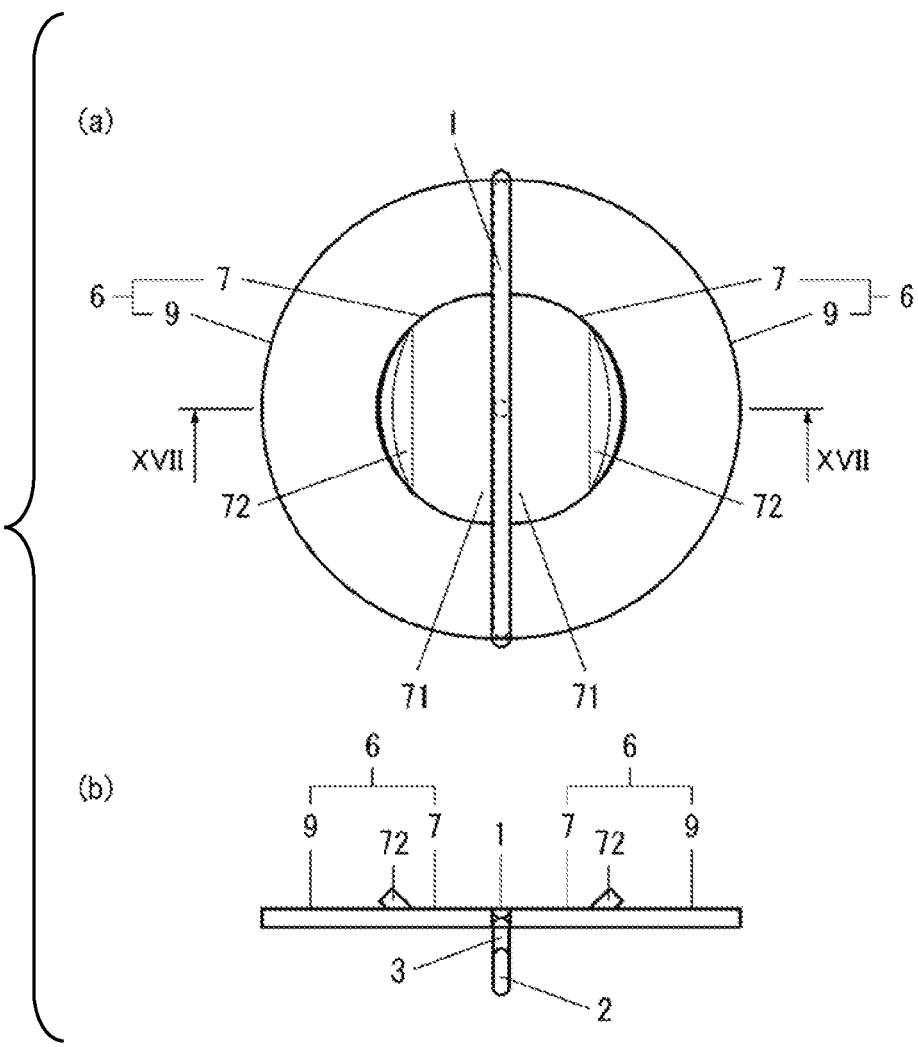
FIG. 16 shows a sixth embodiment of the fastener, with (a) being a plan view, and (b) being a side view.
Figure 17:
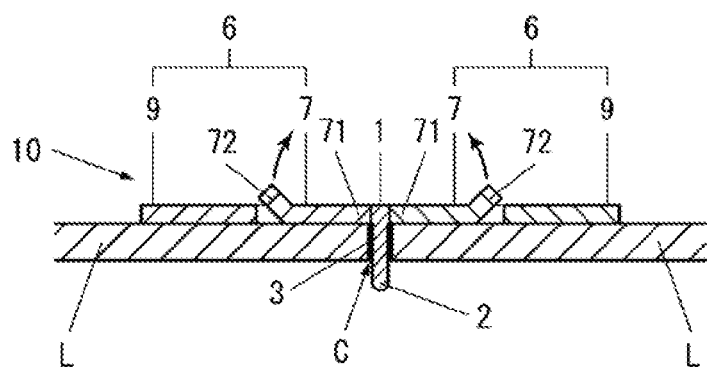
FIG. 17 is a cross section view of line XVII-XVII of FIG. 16.

Next, a sixth embodiment of the fastener of the present invention is explained with a focus on the difference points from the first embodiment. Compared to the first embodiment, the sixth embodiment differs in the shape of the flap abutting parts 6 (tab parts 6). As shown in FIG. 16 and FIG. 17, the flap abutting parts 6 of the sixth embodiment have a flat plate shape, and extend horizontally at both front and rear sides with the receiving part 1 as the center. One flap abutting part 6 is approximately semicircular in the plan view, the diameter is along the receiving part 1, and with the receiving part 1 and the flap abutting parts 6 of both the front and rear sides, this is approximately circular in the plan view. Also, the flap abutting part 6 is divided into an inside part that is concentric with the outer periphery and is approximately semicircular with a diameter of approximately ½, and an outside part surrounding that. The inside part is made from a soft resin that can be curved vertically by human force, and is integrally molded with the receiving part 1 using two color molding. Meanwhile, the outside part is made from a hard resin the same as the receiving part 1, and is integrally molded with the receiving part 1. Thus, in the sixth embodiment, the inside part that is a portion of the flap abutting parts 6 correlates to tab parts 7. Also, the outside part is used as fixing part 9 fixed to the receiving part 1. Also, both front and rear end parts of the tab parts 7, specifically, the tip parts 72 of the side opposite to the root parts 71 joining the receiving part 1 are bent diagonally upward. The range of the bent part is approximately ¼ the front-rear width of the tab part 7, and is oriented at an approximately 45 degree incline to the horizontal direction. Thus, as shown in FIG. 17, when the pressing part 2 of the fastener 10 is inserted in the gap C of the juncture of both flaps L, in a state with the bottom surface of the root parts 71 of the tab parts 7 abutting the top surface of the flaps L, the tip parts 72 separate from the top surface of the flaps L, and the tip parts 72 are the finger hooking parts 72.

According to this sixth embodiment, after inserting the pressing part 2 in the gap C of the juncture of both flaps L, by fingers hooking the finger hooking parts 72, it is possible to easily turn up the tab parts 7, and the operation of gripping the tab parts 7 and rotating the fastener 10 is easy. The sixth embodiment of the fastener otherwise exhibits the same operational effects as the first embodiment. The tab parts 7 are made from a soft resin, so when another box is stacked on a box with this fastener 10 attached, the tip parts 72 (finger hooking parts 72) bent diagonally upward are crushed by the upper box, and the tab parts 7 overall have a flat plate shape. Thus, there is no obstruction when stacking boxes.

The present invention is not limited to the embodiments noted above. For example, provided the cutter park is sharp enough to be able to cut tape, it can be any shape, but an item that is safe even if touched by a finger, etc., is preferable. Also, this may be provided only at one end of the receiving part, or having been provided on both ends, they may be different shapes such as one being a sawtooth shape, etc. Furthermore, the cutter part may also be provided on the pressing part or the linking part. Also, the receiving part and the flap abutting parts may be formed separately and joined using an adhesive agent, or a fitting structure corresponding to the receiving part and the flap abutting part may be formed, with joining done by fitting. Furthermore, the tab parts are not limited to being items that turn up from the front-rear direction with respect to the receiving part that extends in the left-right direction, and may also turn up from the left-right direction or another direction. Also, when using a portion of the flap abutting parts as the tab parts, any part of the flap abutting parts may be used as the tab parts. Furthermore, the tab parts may have the junction part of the tab parts and the receiving part be a fold or a hinge, and be bendable at that part. Also, in this case, the tab parts may be made from a hard material. Also, in this case, the material of each part including the tab parts may be a metal rather than resin. Furthermore, the finger hooking parts may also be items formed with the tip part of the tab parts being thick. Also, the box that is the target of this fastener is not limited to being an item having double-door type flaps on the top surface, and may also be an item having a flap on the side surface. In this case, the fastener is attached in a state with the flap abutting parts being vertically oriented.

The invention claimed is:

1. A fastener configured to fix a pair of opposing flaps of a box in a closed state, comprising:

a receiving part extending along a first direction, with a flap abutting part configured to abut surfaces of the flaps of the box being arranged on at least one side of the receiving part in a second direction orthogonal to the first direction, the flap abutting part constituting a tab part for which at least a portion is curvable or bendable upward;

a linking part having a rod shape and extending from a center portion of the receiving part with respect to the first direction in a direction orthogonal to the first direction and to the second direction; and a pressing part having a rod shape when viewed along a direction parallel to a center axis of the linking part, the pressing part extending outwardly from an end of the linking part along the first direction, the pressing part being configured to be inserted into a gap at a juncture of the flaps of the box in the closed state and rotated about the center axis of the linking part so that spaces on both sides of the linking part between the receiving part and the pressing part constitute insertion areas into which the flaps of the box are inserted.

2. The fastener according to claim 1, wherein
a tip portion of the tab part constitutes a finger hooking part that is separated from the flaps in a state with a bottom surface of a base part of the tab part being abutted on the flaps.

3. The fastener according to claim 2, wherein
the finger hooking part is bent in a direction away from the pressing part.

4. The fastener according to claim 2, wherein
the finger hooking part has a partial dome shape.

5. The fastener according to claim 1, further comprising
a cutter part on the receiving part, the pressing part, or the linking part.

6. The fastener according to claim 1, wherein
the flap abutting part is arranged on each side of the receiving part with respect to the second direction.

7. The fastener according to claim 6, wherein
the tab part on each side of the receiving part is configured to be turned up so that the tip portion of the tab part on each side of the receiving part overlaps each other.

8. The fastener according to claim 1, wherein
the flap abutting part is integrally molded with the receiving part.

9. The fastener according to claim 1, wherein
the flap abutting part has a wavy cross-sectional shape on a plane orthogonal to the first direction.

10. The fastener according to claim 1, wherein
the flap abutting part further includes a fixing part fixed to the receiving part and arranged outwardly of the tab part.

* * * * *